US008841846B2

(12) United States Patent
Yoo et al.

(10) Patent No.: US 8,841,846 B2
(45) Date of Patent: Sep. 23, 2014

(54) METHOD OF CONTROLLING LIGHTS AND SYSTEM FOR MANAGING LIGHTS USING THE SAME

(71) Applicant: Electronics and Telecommunications Research Institute, Daejeon (KR)

(72) Inventors: Seung-mok Yoo, Daejeon (KR); Kwang Soo Kim, Daejeon (KR); Tae-Wook Heo, Daejeon (KR); Hyunhak Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 92 days.

(21) Appl. No.: 13/739,689

(22) Filed: Jan. 11, 2013

(65) Prior Publication Data

US 2013/0320864 A1 Dec. 5, 2013

(30) Foreign Application Priority Data

May 30, 2012 (KR) ........................ 10-2012-0057634

(51) Int. Cl.
*B60Q 1/12* (2006.01)
(52) U.S. Cl.
USPC .................... 315/78; 315/77; 315/82; 315/76

(58) Field of Classification Search
USPC ..................................... 315/77, 78, 79, 80–83
See application file for complete search history.

(56) References Cited

U.S. PATENT DOCUMENTS 6,223,847 B1 * 5/2001 Shimizu et al. ............... 180/204

FOREIGN PATENT DOCUMENTS

| KR | 10-0979724 B1 | 8/2010 |
| KR | 10-0986273 B1 | 10/2010 |
| KR | 10-1015577 B1 | 2/2011 |
| KR | 1020110098076 A | 9/2011 |

* cited by examiner

*Primary Examiner* — Tuyet Thi Vo
(74) *Attorney, Agent, or Firm* — Ladas & Parry LLP

(57) ABSTRACT

In a light-installed area where a plurality of lights are installed, a light managing system senses a moving object that enters the light-installed area and predicts an predicted stop position of the moving object based on record information on a channel of movement corresponding to identification information on the moving object. The light managing system calculates a predicted channel of movement of the moving object based on the predicted stop position, and selects lights to be driven based on the calculated predicted channel of movement. The light managing system turns on the selected lights.

18 Claims, 4 Drawing Sheets

METHOD OF CONTROLLING LIGHTS AND SYSTEM FOR MANAGING LIGHTS USING THE SAME

CROSS-REFERENCE TO RELATED APPLICATION

This application claims priority to and the benefit of Korean Patent Application No. 10-2012-0057634 filed in the Korean Intellectual Property Office on May 30, 2012, the entire contents of which are incorporated herein by reference.

BACKGROUND OF THE INVENTION (a) Field of the Invention

The present invention relates to a method of controlling lights and, more particularly, to a method of controlling driving operations including turning lights on or off and a system for managing lights using the same.

(b) Description of the Related Art

Light controlling technologies have been researched and developed in order to save energy used for driving various types of lights installed in various environments. In order to save energy, particularly in a space such a parking lot of a building, light controlling technologies for sensing a movement of a vehicle or a person to turn lights on or off have been developed.

A movement is sensed to automatically turn lights on or off, while lights are manually turned on or off to save energy in conventional light controlling technologies. In this case, when turning lights on or off is controlled only by a movement, lights in unnecessary positions may also be turned on or off. That is, since turning lights installed in an area where a movement is sensed or lights of an entire area on or off is controlled, lights positioned in an area where an actual movement is not generated are also turned on so that energy is unnecessarily used. For example, in a case of a parking lot, lights positioned in an area where a movement or parking of a vehicle is not performed are also turned on so that energy is unnecessarily used.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of predicting a movement of a vehicle in a space where lights are installed and of controlling turning lights on or off in accordance with a channel of the predicted movement, and a system for managing lights using the same.

According to an embodiment of the present invention, a method of controlling lights by a light managing system in a light-installed area where a plurality of lights are installed is provided. The method includes: sensing a moving object that enters the light-installed area and obtaining identification information on the moving object; estimating a predicted stop position of the moving object based on record information on a channel of movement corresponding to identification information on the moving object; calculating a predicted channel of movement of the moving object based on the predicted stop position; selecting lights to be driven based on the calculated predicted channel of movement; and turning on the selected lights. Here, the predicted channel of movement may include a first predicted channel of movement from a position at which the moving object is sensed to a predicted stop position, and a second predicted channel of movement from the predicted stop position to a position where the moving object leaves the light-installed area.

Estimating of the predicted stop position may include: extracting a stop position from record information items on a channel of movement stored by the hour to correspond to identification information on the moving object in a to predetermined period; providing different weight values to respective stop positions in accordance with time; and estimating the predicted stop position based on the respective stop positions provided with the different weight values.

According to another embodiment of the present invention, a method of controlling lights by a light managing system in a light-installed area where a plurality of lights are installed is provided. The method includes: sensing a vehicle that enters the light-installed area in the first identification position and obtaining identification information on the vehicle; estimating a predicted parking position of the vehicle based on record information on a channel of movement corresponding to identification information on the vehicle; calculating a predicted channel of movement of the moving object based on the predicted parking position, the predicted channel of movement including the first predicted channel of movement from the first identification position to the predicted parking position and the second predicted channel of movement from the predicted parking position to the second identification position; selecting lights to be driven based on the calculated predicted channel of movement; and turning on the selected lights.

Here, the estimating of the predicted parking position may further include determining whether the predicted parking position is empty, and using the predicted parking position as a finally predicted position when the predicted parking position is empty.

In addition, the light controlling method may further include obtaining a parking position of the vehicle, and storing the parking position to correspond to the record information on the channel of movement of the vehicle.

In this case, the light controlling may further include: sensing a driver who enters the light-installed area in the second identification position and obtaining identification information on the driver; obtaining a parking position included in recently input channel of movement input information from the record information on the channel of movement corresponding to the identification information on the driver; calculating a predicted channel of movement including the first predicted channel of movement from the second identification position to the parking position and the second predicted channel of movement from the parking position to the first identification position; selecting lights to be driven based on the calculated predicted channel of movement; and turning on the selected lights.

Here, the first identification position corresponds to an entrance through which a vehicle as a moving object enters a parking lot and the second identification position corresponds to an exit through which a person as a moving object enters the parking lot or leaves the parking lot to move to another floor of a building to which the parking lot belongs.

According to still another embodiment of the present invention, a system for managing lights in a light-installed area where a plurality of lights are installed is provided. The system includes: a moving object identifying apparatus for sensing a moving object that enters the light-installed area and for obtaining identification information on the moving object; an estimating apparatus for estimating a predicted stop position of the moving object based on record information on a channel of movement corresponding to identification information on the moving object and for calculating a predicted channel of movement of the moving object based on the predicted stop position; and a light controlling apparatus for controlling operations of selected lights based on the calculated predicted channel of movement.

The estimating apparatus may include: a channel of movement record storage unit for storing record information on a channel of movement corresponding to record information on a past channel of movement by the hour to correspond to identification information on the moving object; and a channel of movement calculating unit for estimating a predicted stop position of a moving object based on the record information on the channel of movement of the moving object and for calculating a predicted channel of movement based on the predicted stop position. Here, the predicted channel of movement includes a first predicted channel of movement from a position at which the moving object is sensed to the predicted stop position, and may further include a second predicted channel of movement from the predicted stop position to a position where the moving object leaves the light-installed area.

Here, lights installed in an area positioned in a predetermined radius may be selected based on the predicted channel of movement. In this case, the light controlling apparatus may sequentially turn on the selected lights at predetermined intervals from a light closest to a position at which the moving object is sensed.

DETAILED DESCRIPTION OF THE EMBODIMENTS

Figure 1:
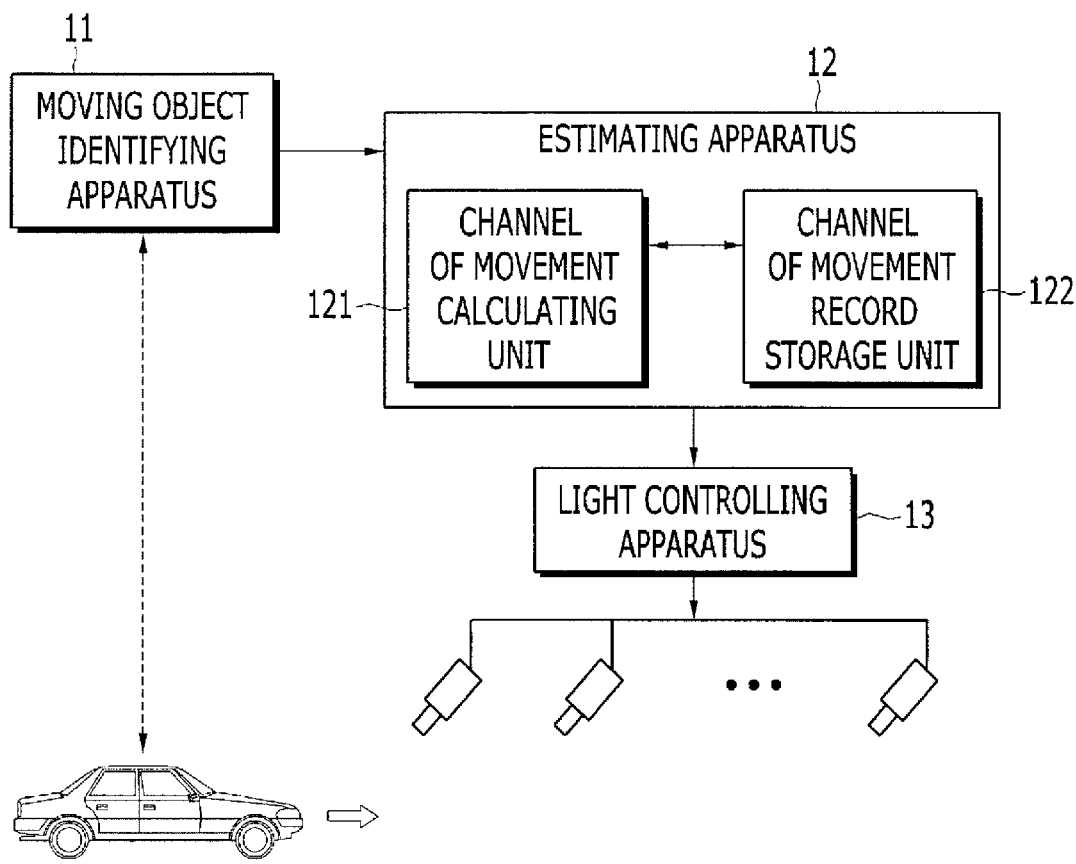
FIG. 1 is a configuration diagram of a light managing system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, in addition, unless explicitly described to the contrary, the word "comprise" and variations such as "comprises" or "comprising" will be understood to imply the inclusion of stated elements but not the exclusion of any other elements.

In an exemplary embodiment of the present invention, a channel of movement of a moving object is predicted in a space where lights are installed, and lights are controlled in accordance with the predicted channel of movement.

FIG. 1 is a configuration diagram of a light managing system according to an exemplary embodiment of the present invention.

A light managing system 1 according to an exemplary embodiment of the present invention predicts a movement of a moving object in a space where a plurality of lights are installed (hereinafter, for better comprehension and ease of description, referred to as "a light-installed area"), and controls the lights in accordance with the predicted movement. For this purpose, as shown in FIG. 1, the light managing system 1 includes a moving object identifying apparatus 11, an estimating apparatus 12, and a light controlling apparatus 13.

The moving object identifying apparatus 11 identifies a moving object that enters a light-installed area. That is, the moving object identifying apparatus 11 obtains identification information on the moving object that enters the light-installed area. Here, the moving object may be a vehicle or a person such as the driver of a corresponding vehicle.

For example, when the light-installed area is a parking lot, the moving object identifying apparatus 11 recognizes the number plate of a vehicle that enters the parking lot to obtain identification information (in this case a vehicle number) on the vehicle. Unlike the above, the moving object identifying apparatus 11 may obtain identification information from a wireless identification tag (e.g., RFID (radio frequency identification tag)) installed in a moving object, that is, a vehicle, or in an apparatus (e.g., a vehicle key) owned by the driver, and may verify identification information on the vehicle matched to the obtained identification information. In addition, the moving object identifying apparatus may obtain predetermined identification information through transmitting/receiving between the moving object identifying apparatus 11 and a wireless communication apparatus that is positioned in the vehicle or is owned by the driver and that may perform wireless communication through a short distance network such as Bluetooth or a wireless local area network (WLAN). In this case, the identification information obtained by the wireless communication apparatus may be the unique address of the wireless communication apparatus, identification information on a user, or identification information on the vehicle. Here, processes of verifying the identification information on the vehicle matched to the obtained identification information may be additionally performed.

The moving object identifying apparatus 11 obtains the identification information on the moving object that enters the light-installed area through the above-described various methods, and may be realized to include at least one of various types of apparatus such as an image processing apparatus such as a camera, a communicable transmitting/receiving apparatus, and an RFID reader.

The estimating apparatus 12 predicts the movement of the moving object. That is, when the moving object is verified based on the identification information on the moving object provided by the moving object identifying apparatus 11, the estimating apparatus 12 predicts the channel of movement of the moving object in a current position where the moving object is verified.

For this purpose, the estimating apparatus 12 includes a channel record storage unit 121 for storing record information on a past channel of movement of a moving object and a channel of movement calculating unit 122 for calculating the channel of movement based on the record information on the channel of movement. The estimating apparatus 12 may be realized in the form of a server.

The channel of movement record storage unit 121 stores the record information on the channel of movement including the channel of movement of the moving object by the hour to correspond to the identification information on the moving object. The record information on the channel of movement includes channel of movement information such as a movement direction in which the moving object moves from the position where the identification information on the moving object is obtained to correspond to time, a channel of movement, a position at which the moving object stops, and a movement distance.

The channel of movement calculating unit 122 calculates the current channel of movement of the moving object based on the record information on the channel of movement of the moving object stored in the channel of movement record storage unit 121. The channel of movement calculating unit 122 predicts the stop position of the moving object and calculates the predicted channel of movement of the moving object based on the predicted stop position. The above will be described later in detail.

The light controlling apparatus 13 controls turning lights positioned in the light-installed area on or off based on the calculated channel of movement of the moving object. For example, lights positioned in a predetermined radius are turned on or off based on the calculated channel of movement. For this purpose, the light controlling apparatus 13 stores and manages position information items on the lights positioned in the light-installed area and finds lights in a range corresponding to the calculated channel of movement of the moving object based on the light position information items to drive the found lights.

Next, a method of controlling lights according to an exemplary embodiment of the present invention will be described based on such a structure.

Figure 2:
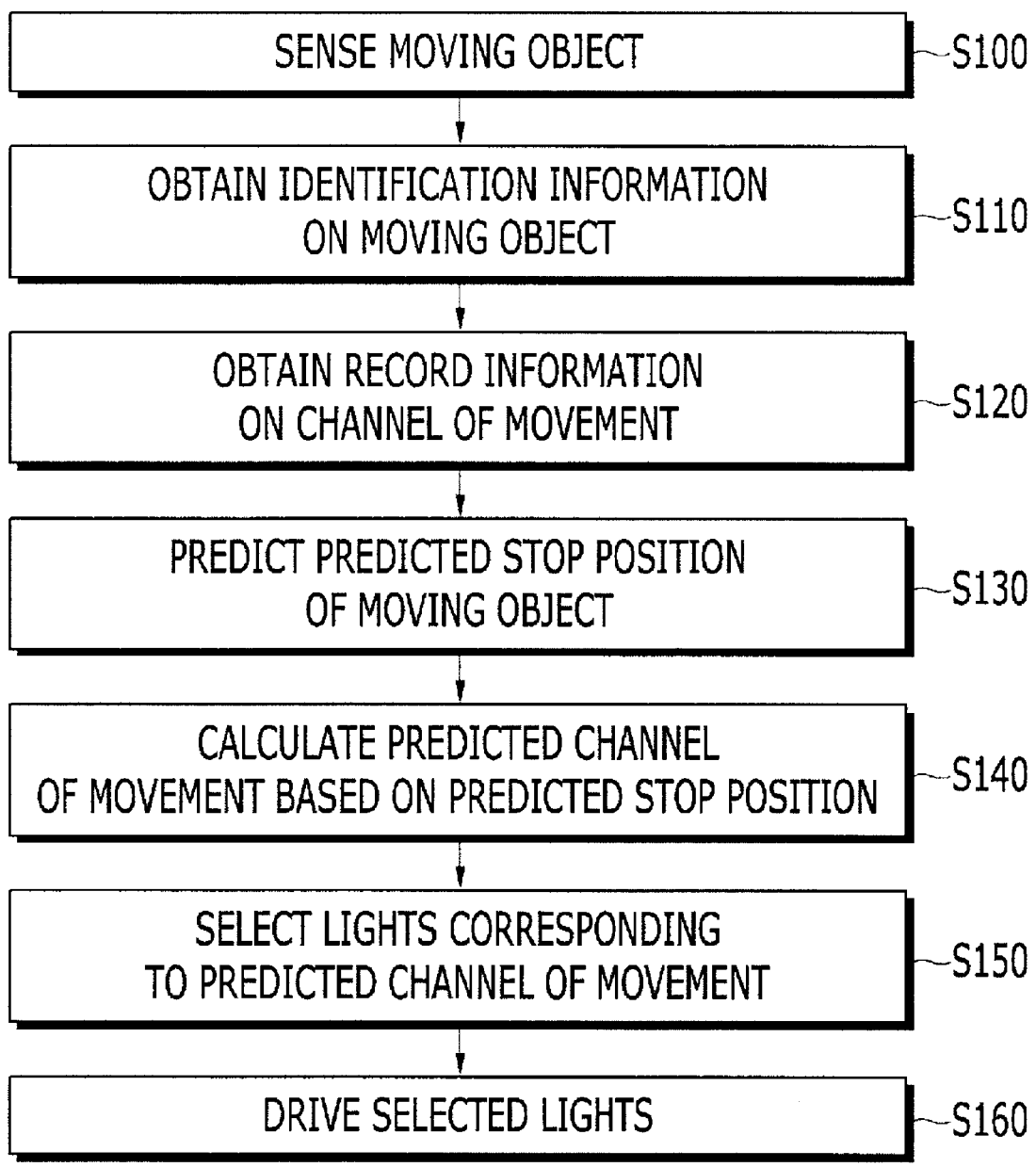
FIG. 2 is a flowchart illustrating a light controlling method according to an exemplary embodiment of the present invention.

FIG. 2 is a flowchart of a method of controlling lights according to an exemplary embodiment of the present invention.

When a moving object enters a light-installed area in which a plurality of lights are installed, the moving object identifying apparatus 11 identifies the moving object S100 to obtain identification information on the moving object S110. After obtaining the identification information through various methods, the moving object identifying apparatus 11 provides the obtained identification information on the moving object to the estimating apparatus 12.

The estimating apparatus 12 searches the record information on the channel of movement corresponding to the received identification information on the moving object and predicts the direction the moving object that currently enters the light-installed area will move based on the record information on the channel of movement S120.

The record information on the channel of movement stored with respect to the moving object includes information on the channel of movement of the moving object by the hour, particularly, information on the position at which the moving object stops. Here, the position at which the moving object stops, that is, the stop position of the moving object, does not represent a position where the moving object simply stops during movement but represents a position at which the moving object stops without movement for no less than a predetermined time. For example, when the light-installed area is a parking lot, the stop position of the moving object is a parking position of a vehicle. In addition, the stop position of the moving object may be a fixed position, or it may be a variable position such as the parking position of the vehicle. However, the parking position of the vehicle commonly in the parking lot flexibly changes in a predetermined range in accordance with the tendency of the driver or the location the driver wishes to go. Therefore, according to an exemplary embodiment of the present invention, when the stop position of the moving object is not always fixed but is variable in accordance with the characteristics of the light-installed area, as follows, the current stop position of the moving object that enters the light-installed area is predicted based on the record information on the channel of movement of the moving object.

According to an exemplary embodiment of the present invention, in order to predict the channel of movement of the moving object, the current stop position of the moving object is predicted using the stop position of the moving object included in the record information on the channel of movement.

$$C = \sum_{i=1}^{n} w_i C_i \qquad \text{(Equation 1)}$$

In Equation 1, $c_i$ represents a position at which the moving object has stopped in the past and $w_i$ represents a weight value. The weight value $w_i$ according to an exemplary embodiment of the present invention varies with time and satisfies the following condition.

$$\sum_{i=1}^{n} w_i = 1 \qquad \text{(Equation 2)}$$

In Equations 1 and 2, i that changes from 1 to n represents a temporal order, and as i increases, it means that data is more recently obtained. In Equation 2, when i<j with respect to arbitrary i and $w_i \leq w_j, w_i \leq w_j$.

The estimating apparatus 12 obtains stop positions of the moving object from record information items on the channel of movement obtained in a predetermined period (a period of a predetermined time from the present, for example, a period of a week in the past) based on Equation 1, and provides different weight values $w_i$ in accordance with corresponding times to the obtained stop positions of the moving object. Then, the estimating apparatus 12 combines the stop positions of the moving object provided with the weight values to predict a stop position that is the current stop position of the moving object S130.

As described above, in order to predict the channel of movement of the moving object, the average of the record information items on the channel of movement of the moving object is not simply calculated but a weight value slightly higher than or the same as the past weight value is provided to recent data to predict the channel of movement of the moving object.

Unlike in the above-described method, in order to predict the channel of movement of the moving object, the most frequent value may be used. In a method using the most frequent value, the position of the moving object is predicted by frequencies of no less than a set value based on materials collected in a predetermined period. At this time, the position of the moving object may be predicted by values obtained by multiplying the positions by the weight values using the stop positions of the moving object having frequencies of no less than the set value. For example, among the stop positions of the moving object in the record information items on the channel of movement obtained in the past week, the stop positions of the moving object having frequencies of no less than the set value are selected and values obtained by multiplying predetermined weight values by values of corresponding positions, that is, comparison values, are calculated with respect to the selected stop positions of the moving object. Then, it is determined whether differences between the comparison values of the corresponding stop positions and an average value of the comparison values of the other stop positions are no less than the set value with respect to the selected stop positions of the moving object. The channel of movement of the moving object is predicted based on the remaining stop positions excluding the stop positions in which the differences between the comparison values of the stop positions and the average value of the comparison values of the other stop positions are no less than a set value among the selected stop positions of the moving object. The parking position preference of the driver may be reflected by the above method. It is determined that a place having a high parking frequency has a high parking position preference, and that a place having a low parking frequency (e.g., a case in which one-off parking is performed) has a low parking position preference. It is determined that the driver is obliged to perform parking in a place having a low parking frequency when he or she is not able to perform parking in a desired place. A parking position having a frequency of no more than the set value is excluded during calculation of the predicted channel of movement.

In order to improve correctness of estimation, the above method in accordance with time and values in accordance with frequencies may be used together.

The estimating apparatus 12 predicts the stop position of the moving object that currently enters the light-installed area, and calculates the predicted channel of movement in which the moving object is to move in the current position based on the predicted stop position S140. The calculated predicted channel of movement includes a first predicted channel of movement from the position of the moving object that currently enters the light-installed area to the predicted stop position, and may include a second predicted channel of movement from the predicted stop position to the closest exit. For example, when the light-installed area is a parking lot, the calculated predicted channel of movement may include the first predicted channel of movement from a position identified by a vehicle entering the parking lot to a parking position at which the vehicle is predicted to be parked, and the second predicted channel of movement from the parking position of the vehicle to the closest exit.

Then, the estimating apparatus 12 selects lights to be driven based on the calculated predicted channel of movement. Here, the estimating apparatus 12 selects lights positioned in a predetermined radius based on the channel of movement as well as lights installed at the position corresponding to the predicted channel of movement to consider that the moving object may deviate from the predicted channel of movement S150.

The estimating apparatus 12 selects lights based on the predicted channel of movement and provides information on the selected lights to the light controlling apparatus 13. Accordingly, the light controlling apparatus 13 turns on the selected lights S160. At this time, the light controlling apparatus 13 may simultaneously turn on the selected lights or may sequentially turn on the selected lights at predetermined intervals from the light closest to the moving object. When the lights are sequentially turned on at predetermined intervals, the predetermined intervals may be determined in consideration of the moving speed of the moving object. In addition, the lights corresponding to the predicted channel of movement are turned on prior to the moving position of the moving object so that the lights may perform a function of guiding the channel of movement of the moving object.

As described above, the channel of movement of the moving object in the light-installed area is predicted so that only the lights corresponding to the corresponding channel of movement are turned on and that lights in an unnecessary area remain turned off to save energy. In addition, the lights in the predicted channel of movement are turned on to guide the channel of movement of the moving object.

Next, a method of controlling lights according to another exemplary embodiment of the present invention will be described.

As in the above exemplary embodiment, when a moving object is a vehicle and a light-installed area is a parking lot, lights may be controlled in consideration of a first case in which the vehicle enters the parking lot and a second case in which the vehicle leaves the parking lot. In the second exemplary embodiment of the present invention, the lights are controlled in consideration of the first case and the second case.

Figure 3:
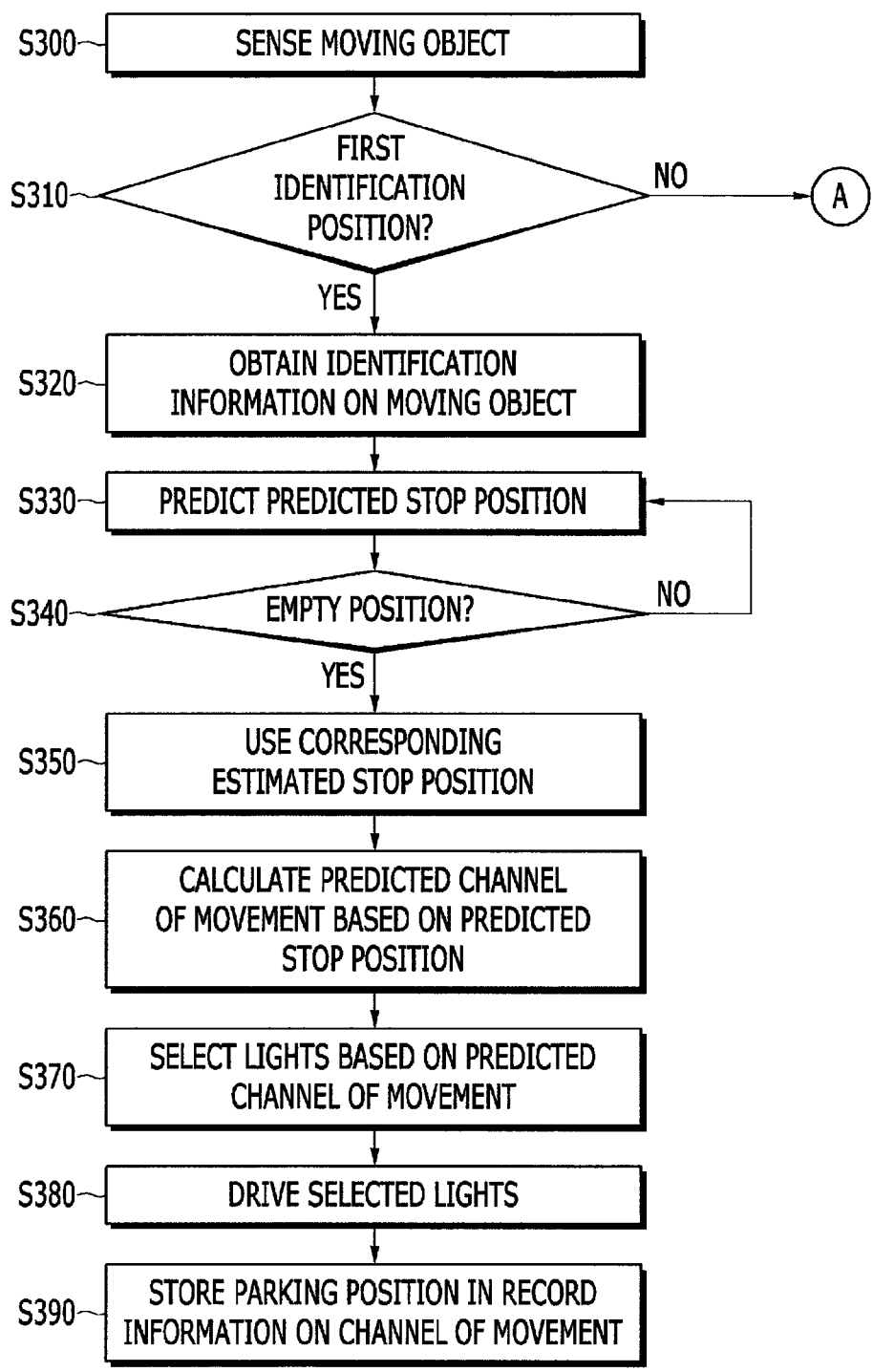
FIG. 3 and FIG. 4 are flowcharts of a light controlling method according to another exemplary embodiment of the present invention.
Figure 4:
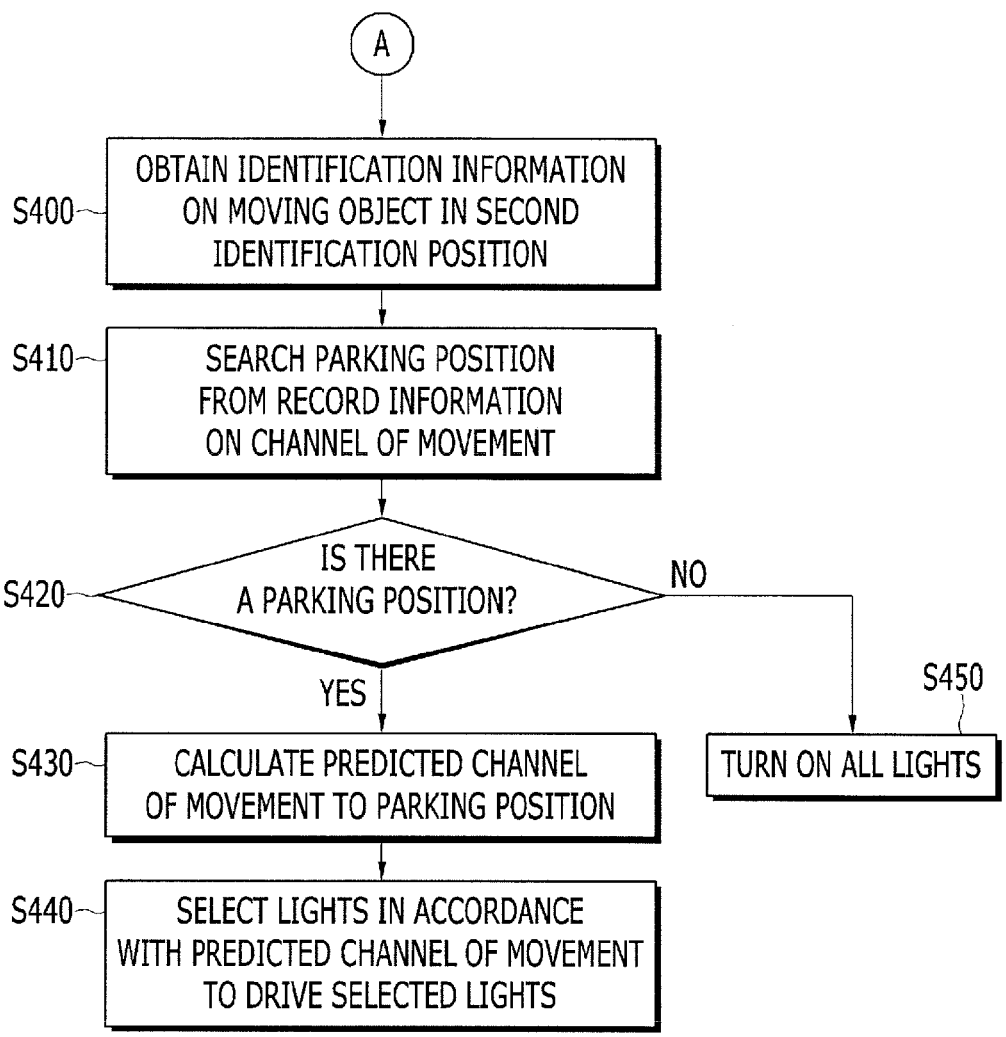

FIG. 3 and FIG. 4 are flowcharts of a method of controlling lights according to another exemplary embodiment of the present invention.

Here, the light-installed area is the parking lot, a position corresponding to an entrance through which the vehicle as the moving body enters the parking lot is referred to as a first identification position, and a position corresponding to an exit where people as moving objects enter the parking lot or leave the parking lot to move to another floor of the building to which the parking lot belongs is referred to as a second identification position. There may be multiple second identification positions.

As shown in FIG. 3, the moving object identifying apparatus 11 verifies identification information on the moving object in the first identification position S320 when the vehicle as the moving object is sensed in the first identification position S300 and S310. Here, at least one of a vehicle number, identification information on an identification tag attached to the driver, the vehicle, or goods owned by the driver, the telephone number of a portable terminal of the driver, and identification information items on an additional wireless communication device installed in the vehicle may be verified, and the verified information may be used as identification information on the moving object or identification information on the moving object corresponding to the verified information may be obtained.

When the identification information on the moving object is obtained in the first identification position, the moving object identifying apparatus 11 transmits the identification information to the estimating apparatus 12. At this time, information on the first identification position may also be provided to the estimating apparatus 12. The estimating apparatus 12 predicts the parking position that is the predicted stop position of the corresponding vehicle in accordance with Equations 1 and 2 based on the record information items on the channel of movement corresponding to the identification information on the moving object S330. In this case, the estimating apparatus 12 predicts the parking position that is the predicted stop position and determines whether the corresponding parking position is empty S340. When it is determined that the corresponding parking position is not empty, the estimating apparatus 12 may predict another parking position. In order to determine whether the parking position is empty, the estimating apparatus 12 may use an image obtained by a monitoring apparatus (e.g., CCTV) installed in the parking lot.

The estimating apparatus 12 calculates the predicted channel of movement of the vehicle as the moving object based on the predicted parking position S350 and S360. Here, the calculated predicted channel of movement of the vehicle includes the first predicted channel of movement from the first identification position to the predicted parking position, and may further include the second predicted channel of movement from the predicted parking position to the second identification position closest to the predicted parking position among a plurality of second identification positions or the second predicted channel of movement from the predicted parking position to the second identification position mainly used by the driver of the vehicle as the moving object among a plurality of second identification positions. Here, the second identification position mainly used by the driver may be predicted based on the record information on the channel of movement. That is, the second identification position used by the corresponding driver is stored in the record information on the channel of movement by the hour, and the second identification position to be currently used by the driver may be predicted based on the second identification positions included in the record information.

The estimating apparatus 12 calculates the predicted channel of movement of the vehicle as the moving object, and selects the lights positioned in the predetermined radius based on the predicted channel of movement S370. The light controlling apparatus 13 turns on the selected lights S380. For example, the lights corresponding to the first predicted channel of movement are sequentially turned on from the current position of the vehicle to the predicted parking position, and then the lights corresponding to the second predicted channel of movement from the predicted parking position to the selected second identification position are turned on.

Therefore, the driver may easily move to the corresponding parking position based on the lights turned on from the moment the driver enters the parking lot. In addition, the driver is guided by the lights that are turned on in accordance with a preferred empty parking position by the light controlling apparatus to easily park the vehicle without searching the parking lot.

Here, the estimating apparatus 12 has the current parking position included and stored in the record information on the channel of movement corresponding to the identification information on the corresponding moving object S390. The stored current parking position is used while controlling the lights according to the second case. The current parking position may be stored after the driver parks the vehicle and then leaves the parking lot through the second identification position included in the predicted channel of movement. In addition, the light controlling apparatus 13 turns off the lights after the passage of a predetermined time after turning on the lights in accordance with the predicted channel of movement to save energy. Here, the predetermined time may be set in consideration of time from the moment when the driver parks the vehicle to the moment when the driver leaves the parking lot through the second identification position.

On the other hand, in S310, the moving object identifying apparatus 11 verifies the identification information on the moving object in the second identification position as shown in FIG. 4 S400 when the moving object is sensed in the second identification position, and transmits the verified information on the moving object and information on the second identification position where the moving object is identified to the estimating apparatus 12. Here, at least one of identification information on an identification tag attached to goods owned by the driver and the telephone number of a portable terminal of the driver may be verified, and the verified information may be used as the identification information on the moving object or the identification information on the moving object corresponding to the verified information may be obtained.

The estimating apparatus 12 searches the current parking position from the record information on the channel of movement based on the identification information on the moving object S410. That is, when the moving object is sensed in the second identification position, it is determined that the driver as the moving object leaves the parking lot by moving through the parked vehicle to search the parking position in which the vehicle was previously parked.

The predicted channel of movement of the driver as the moving object is calculated based on the searched parking position S420 and S430. Here, the predicted channel of movement may include the first predicted channel of movement from the second identification position to the parking position and the second predicted channel of movement from the parking position to the first identification position.

When the lights to be driven are selected based on the predicted channel of movement calculated by the estimating apparatus 12, the light controlling apparatus 13 turns on the selected lights like in the above exemplary embodiment S440. Therefore, the driver who enters the parking lot may easily search the position in which his or her vehicle is parked in accordance with the driven lights, and only the lights corresponding to the predicted channel of movement of the driver are driven so that energy may be saved.

Then, the light controlling apparatus 13 may turn off all of the turned on lights after it is determined that the vehicle of the driver leaves the parking lot in the first identification position, or may turn off the lights after the passage of a predetermined time after the driver is identified at the second identification position.

On the other hand, in S420, when it is determined that the parking position is not stored in the recent record information on the channel of movement to correspond to the identification information of the driver as the moving object, it is determined that the corresponding driver does not enter the parking lot in order to search the parked vehicle but enters the parking lot for another purpose so that all of the lights in the corresponding parking lot may be turned on. In addition, the channel of movement from the current second identification position to the closest exit is calculated so that the lights corresponding to the corresponding channel of movement may be turned on.

On the other hand, in the above exemplary embodiments, the estimating apparatus 12 selects the lights to be driven in accordance with the predicted channel of movement. However, unlike in the above exemplary embodiments, the light controlling apparatus 13 may receive the predicted channel of movement and may select the lights to be driven in accordance with the predicted channel of movement.

The above-described light controlling method and light managing system may be applied to a light-installed area as well as the parking lot.

According to the above exemplary embodiments, the lights are not simply controlled by sensing the movement of the moving object but the channel of movement of the moving object is predicted so that the lights may be driven based on the predicted channel of movement. Therefore, it is possible to simultaneously realize an intelligent parking guide function and a function of saving energy by controlling the lights of the predicted channel of movement when the vehicle enters.

According to an exemplary embodiment of the present invention, the movement of the moving object including the vehicle is predicted in a space where lights are installed so that the channel of movement of the moving object is predicted, and turning the lights on or off corresponding to the predicted channel of movement is controlled to efficiently turn the lights on or off.

Particularly, the lights are driven in accordance with the channel of movement through which a position at which a vehicle is to be parked is predicted in accordance with the movement of the vehicle in an area such as a parking lot, so that only the lights positioned in the corresponding channel of movement are turned on and it is possible to prevent lights positioned in another area from being unnecessarily turned on.

In addition, the lights in the corresponding channel of movement are previously driven in accordance with the predicted channel of movement of the vehicle so that the vehicle or the driver may be efficiently guided to the parking position. Therefore, an intelligent parking guide function and a function of saving energy used for driving the lights may be simultaneously realized.

The exemplary embodiments of the present invention may also be implemented by a program realizing functions corresponding to the construction of the embodiment, and a recording medium on which the program is recorded, other than the apparatus and/or method described above. Such implementation may be easily made from the disclosure of the above embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling lights by a light managing system in a light-installed area where a plurality of lights are installed, the method comprising:
   sensing a moving object that enters the light-installed area and obtaining identification information on the moving object;
   estimating a predicted stop position of the moving object based on record information on a channel of movement corresponding to identification information on the moving object;
   calculating a predicted channel of movement of the moving object based on the predicted stop position;
   selecting lights to be driven based on the calculated predicted channel of movement; and
   turning on the selected lights.

2. The method of claim 1, wherein the predicted channel of movement comprises a first predicted channel of movement from a position at which the moving object is sensed to a predicted stop position, and a second predicted channel of movement from the predicted stop position to a position where the moving object leaves the light-installed area.

3. The method of claim 1, wherein
   in selecting the lights, lights installed in an area positioned in a predetermined radius are selected based on the calculated predicted channel of movement.

4. The method of claim 1, wherein
   in turning on the selected lights, the selected lights are sequentially turned on from a light closest to a position at which the moving object is sensed at predetermined intervals.

5. The method of claim 1, wherein
   estimating of the predicted stop position comprises:
   extracting a stop position from record information items on a channel of movement stored by the hour to correspond to identification information on the moving object in a predetermined period;
   providing different weight values to the respective stop positions in accordance with time; and
   estimating the predicted stop position based on the respective stop positions provided with the different weight values.

6. The method of claim 1, wherein the moving object is a vehicle and the predicted stop position is a parking position of the vehicle.

7. A method of controlling lights by a light managing system in a light-installed area where a plurality of lights are installed, the method comprising:
   sensing a vehicle that enters the light-installed area in the first identification position and obtaining identification information on the vehicle;
   estimating a predicted parking position of the vehicle based on record information on a channel of movement corresponding to identification information on the vehicle;
   calculating a predicted channel of movement of the moving object based on the predicted parking position, the predicted channel of movement including the first predicted channel of movement from the first identification position to the predicted parking position and the second predicted channel of movement from the predicted parking position to the second identification position;
   selecting lights to be driven based on the calculated predicted channel of movement; and
   turning on the selected lights.

8. The method of claim 7, wherein
   estimating the predicted parking position comprises:
   determining whether the predicted parking position is empty; and
   using the predicted parking position as a finally predicted position when the predicted parking position is empty.

9. The method of claim 7, wherein the first identification position corresponds to an entrance through which a vehicle as a moving object enters a parking lot, and the second identification position corresponds to an exit through which a person as a moving object enters the parking lot or leaves the parking lot to move to another floor of a building to which the parking lot belongs.

10. The method of claim 7, wherein
    estimating the predicted parking position comprises:
    extracting a stop position from record information items on a channel of movement stored by the hour to correspond to identification information on the moving object in a predetermined period;
    providing different weight values to the respective stop positions in accordance with time; and
    estimating the predicted stop position based on the respective stop positions provided with the different weight values.

11. The method of claim 7, wherein
    estimating of the predicted parking position comprises:
    selecting stop positions of a moving object having frequencies of no less than a set value among stop positions of a moving object in record information items on a channel of movement obtained in a predetermined period, and calculating comparison values obtained by multiplying predetermined weight values by values of the selected stop positions of the moving object;
    comparing the comparison values of the selected stop positions of the moving object with an average value of comparison values of the other stop positions; and
    estimating a predicted channel of movement based on the remaining stop positions excluding stop positions in which the differences between the comparison values of the stop positions and the average value of the comparison values of the other stop positions are no less than a set value among the selected stop positions of the moving object.

12. The method of claim 7, further comprising
obtaining a parking position of the vehicle, and storing the parking position to correspond to the record information on the channel of movement of the vehicle.

13. The method of claim 12, further comprising:
sensing a driver who enters the light-installed area in the second identification position and obtaining identification information on the driver;
obtaining a parking position included in recently input channel of movement input information from the record information on the channel of movement corresponding to the identification information on the driver;
calculating an predicted channel of movement including the first predicted channel of movement from the second identification position to the parking position and the second predicted channel of movement from the parking position to the first identification position;
selecting lights to be driven based on the calculated predicted channel of movement; and
turning on the selected lights.

14. A system for managing lights in a light-installed area where a plurality of lights are installed, the system comprising:
a moving object identifying apparatus for sensing a moving object that enters the light-installed area and for obtaining identification information on the moving object;
an estimating apparatus for estimating a predicted stop position of the moving object based on record information on a channel of movement corresponding to identification information on the moving object and for calculating a predicted channel of movement of the moving object based on the predicted stop position; and
a light controlling apparatus for controlling operations of selected lights based on the calculated predicted channel of movement.

15. The system of claim 14, wherein
when the moving object is a vehicle, the estimating apparatus verifies whether the predicted stop position is empty in association with a monitoring apparatus installed in the light-installed area, and calculates the predicted channel of movement based on the predicted stop position when the predicted stop position is empty.

16. The system of claim 14, wherein
lights installed in an area positioned in a predetermined radius are selected based on the predicted channel of movement, and
the light controlling apparatus sequentially turns on the selected lights at predetermined intervals from a light closest to a position at which the moving object is sensed.

17. The system of claim 14, wherein the estimating apparatus comprises:
a channel of movement record storage unit for storing record information on a channel of movement corresponding to record information on a past channel of movement by the hour to correspond to identification information on the moving object; and
a channel of movement calculating unit for estimating a predicted stop position of a moving object based on the record information on the channel of movement of the moving object and for calculating a predicted channel of movement based on the predicted stop position,
wherein the predicted channel of movement comprises a first predicted channel of movement from a position at which the moving object is sensed to the predicted stop position, and further comprises a second predicted channel of movement from the predicted stop position to a position where the moving object leaves the light-installed area.

18. The system of claim 17, wherein the estimating apparatus provides different weight values to stop positions included in record information items on a channel of movement corresponding to a predetermined period of the moving object in accordance with time, and predicts the predicted stop position based on the stop positions provided with different weight values.

* * * * *